(12) United States Patent
Arai et al.

(10) Patent No.: US 8,503,133 B2
(45) Date of Patent: Aug. 6, 2013

(54) FLEXURE TO BE SECURED TO A LOAD BEAM OF A DISK DRIVE SUSPENSION

(75) Inventors: Hajime Arai, Aiko-gun (JP); Hideki Fuchino, Aiko-gun (JP)

(73) Assignee: NHK Spring Co., Ltd., Tokohama-Shi (JP)

( * ) Notice: Subject to any disclaimer, the term of this patent is extended or adjusted under 35 U.S.C. 154(b) by 0 days.

(21) Appl. No.: 12/858,547

(22) Filed: Aug. 18, 2010

(65) Prior Publication Data

US 2011/0058281 A1   Mar. 10, 2011

(30) Foreign Application Priority Data

Sep. 8, 2009   (JP) .................................. 2009-207272

(51) Int. Cl.
  *G11B 5/48*   (2006.01)
(52) U.S. Cl.
  USPC ................... 360/245.9; 360/245.8; 360/244.1
(58) Field of Classification Search
  USPC ................. 360/245.8–245.9, 244.1
  See application file for complete search history.

(56) References Cited

U.S. PATENT DOCUMENTS

| 5,949,617 | A  | * | 9/1999  | Zhu .......................... 360/244.8 |
| 6,754,045 | B2 |   | 6/2004  | Korkowski et al. |
| 6,762,913 | B1 |   | 7/2004  | Even et al. |
| 6,891,700 | B2 |   | 5/2005  | Shiraishi et al. |
| 6,894,875 | B2 | * | 5/2005  | Serizawa et al. ........... 360/264.2 |
| 2006/0218772 | A1 |   | 10/2006 | Yao et al. |
| 2008/0253028 | A1 | * | 10/2008 | Chang et al. ............... 360/244.3 |
| 2010/0157482 | A1 | * | 6/2010  | Hirata ........................ 360/245.8 |

FOREIGN PATENT DOCUMENTS

| JP | 9-282624 A     | 10/1997 |
| JP | 2002-251706 A  | 9/2002  |
| JP | 2003-152404 A  | 5/2003  |
| JP | 2005-078688 A  | 3/2005  |

OTHER PUBLICATIONS

Japanese Office Action dated Jun. 4, 2013 (and English translation thereof) in counterpart Japanese Application No. 2009-207272.

* cited by examiner

*Primary Examiner* — Hoa T Nguyen
*Assistant Examiner* — Carlos E Garcia
(74) *Attorney, Agent, or Firm* — Holtz, Holtz, Goodman & Chick, P.C.

(57) ABSTRACT

A flexure with conductors is provided with a flexure tail portion. The flexure tail portion includes a metal base, an electrically insulating layer, and a conductive member. The metal base is formed with a plurality of apertures. A damper is attached to the flexure tail portion. The damper includes a viscoelastic member and a metallic constrained plate. The viscoelastic member has first and second surfaces. The first surface of the viscoelastic member is secured to the flexure tail portion. The constrained plate is secured to the second surface of the viscoelastic member. The constrained plate extends longitudinally relative to the metal base along the conductive member. The conductive member and the constrained plate face each other with the viscoelastic member therebetween.

3 Claims, 7 Drawing Sheets

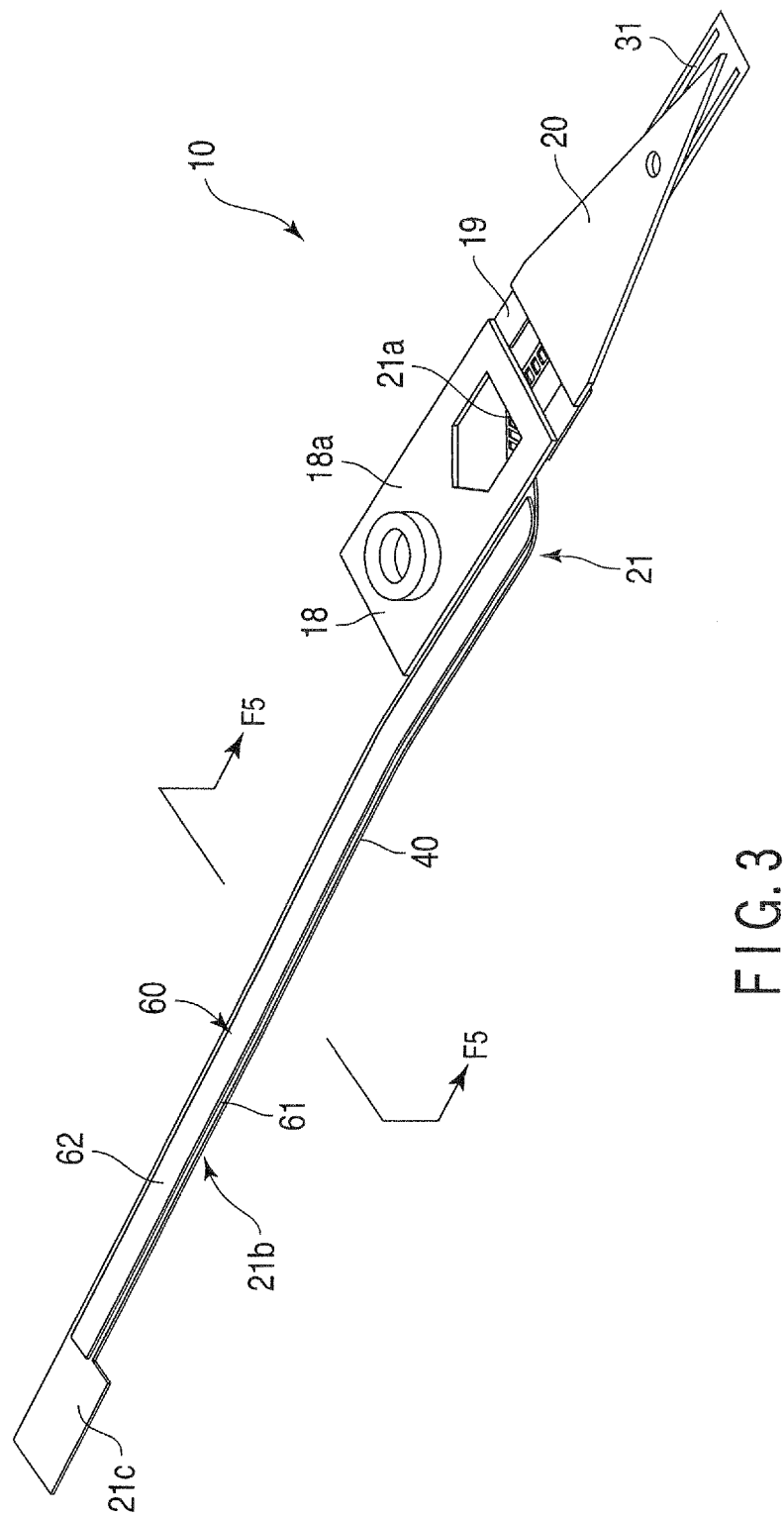
F I G. 3

FLEXURE TO BE SECURED TO A LOAD BEAM OF A DISK DRIVE SUSPENSION

CROSS-REFERENCE TO RELATED APPLICATIONS

This application is based upon and claims the benefit of priority from prior Japanese Patent Application No. 2009-207272, filed Sep. 8, 2009, the entire contents of which are incorporated herein by reference.

BACKGROUND OF THE INVENTION

1. Field of the Invention

This invention relates to a suspension comprising a flexure with conductors and used in a disk drive for an information processing apparatus, such as a personal computer.

2. Description of the Related Art

A hard disk drive (HDD) is used in an information processing apparatus, such as a personal computer. The hard disk drive comprises a magnetic disk rotatable about a spindle, a carriage turnable about a pivot, etc. A suspension is mounted on an arm of the carriage. Examples of the suspension are disclosed in Jpn. Pat. Appln. KOKAI Publication No. 9-282624 (Patent Document 1) and U.S. Pat. No. 6,754,045 (Patent Document 2). The suspension comprises a load beam, a flexure superposed on the load beam, etc. A gimbal portion is formed near the distal end of the flexure, and a slider is mounted on the gimbal portion. The slider is provided with elements (transducers) for accessing data, that is, for reading or writing data.

Flexures of various forms have been put to practical use according to required specifications. A flexure with conductors is a known example, which comprises a metal base formed of a thin stainless-steel sheet, electrically insulating layer formed on the metal base, conductive members, etc. The insulating layer is formed of an electrically insulating material, such as polyimide. The conductive members are formed of copper and arranged on the insulating layer. One end of each conductive member is electrically connected to an element (e.g., an MR element) of the slider, and the other end to an electrical circuit, such as an amplifier.

The conductive members are disposed parallel to the metal base with the electrically insulating layer therebetween. An eddy-current loss is caused if a high-frequency current is passed through the conductive members. This eddy-current loss is influenced by the metal base. A flexure with conductors whose metal base is not formed with apertures, for example, is subject to a substantial eddy-current loss. Since the loss in a high-frequency band is particularly great, in this case, it is disadvantageous to high-speed data transmission. In the flexure disclosed in Patent Document 1, a plurality of apertures are formed at regular intervals in the longitudinal direction of the metal base. These apertures can reduce the eddy-current loss at a conductive circuit portion.

The rear part (so-called flexure tail portion) of the flexure with conductors extends from the rear end of the load beam toward the carriage. Therefore, the flexure tail portion is liable to sway. In order to suppress the sway of the flexure tail portion, in an actuator assembly of Patent Document 2, a slit is formed in the carriage, and the flexure tail portion is inserted into the slit.

In the flexure with a large number of apertures in the metal base, as described in Patent Document 1, the eddy-current loss at the conductive circuit portion can be reduced in comparison with the case of the flexure without apertures. If the apertures are formed in the metal base, however, the larger the apertures, the smaller the capacitance of the metal base is, so that the impedance increases. Thus, there is a problem that the larger the apertures, the higher the energy consumption is. If the apertures are formed in the metal base, moreover, the metal base is susceptible to an air current that is produced as the disk rotates at high speed. Thereupon, the flexure vibrates, thereby causing the problem of resonance, in some cases.

In the arrangement described in Patent Document 2, the flexure is secured to a part of the metallic carriage. While the sway of the flexure can be suppressed, according to this arrangement, electrical properties vary between a region to which the flexure is secured and other regions free from the flexure. This variation may influence signals that are transmitted in a high-frequency band, in particular, thereby hindering high-speed data transmission.

BRIEF SUMMARY OF THE INVENTION

The present invention provides a disk drive suspension configured so that a conductive circuit portion is subject to a small eddy-current loss, suitable for high-speed data transmission, and capable of suppressing sway of a flexure.

The present invention is a disk drive suspension, which comprises a load beam and a flexure with conductors secured to the load beam, the flexure including a flexure tail portion. The flexure tail portion includes a metal base formed of a metal plate, an electrically insulating layer of an electrically insulating material formed on the metal base, and a conductive member formed on the electrically insulating layer and extending longitudinally relative to the metal base. The flexure tail portion is fitted with a damper. The damper includes a viscoelastic member and a metallic constrained plate. The viscoelastic member has first and second surfaces, the first surface being secured to the flexure tail portion. The constrained plate is secured to the second surface of the viscoelastic member and extends longitudinally relative to the metal base along the conductive member. The constrained plate and the conductive member face each other with the viscoelastic member therebetween.

In an aspect of the invention, the conductive member is disposed above one surface of the metal base, the metal base is formed with a plurality of apertures along the conductive member, and the damper is located on the other surface of the metal base. In a preferred form of the invention, moreover, the conductive member is disposed above one surface of the metal base, and the damper is located on the conductive member directly or with a resin cover therebetween. In the case of this form, the metal base may be formed with a plurality of apertures along the conductive member.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a perspective view of a disk drive suspension according to a first embodiment of the invention;

DETAILED DESCRIPTION OF THE INVENTION

A disk drive suspension according to a first embodiment of the present invention will now be described with reference to FIGS. 1 to 6.

Figure 1:
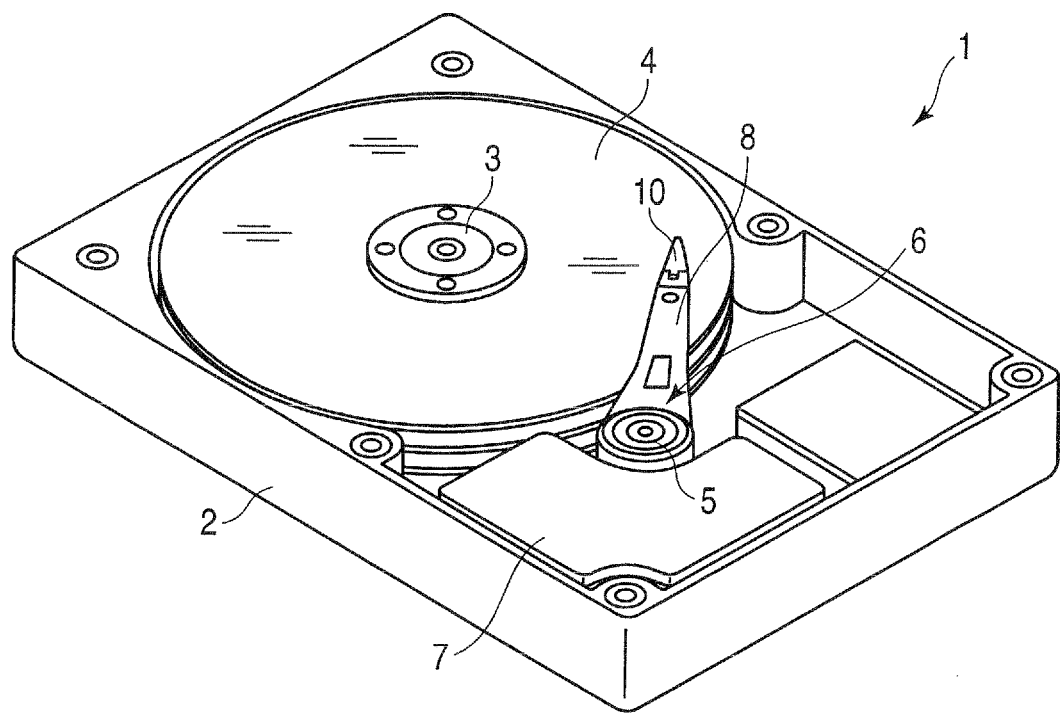
FIG. 1 is a perspective view showing an example of a disk drive.

A disk drive (HDD) 1 shown in FIG. 1 comprises a case 2, spindle 3, disks 4, carriage 6, positioning motor 7 for actuating the carriage 6, etc. The disks 4 are rotatable about the spindle 3, while the carriage 6 is turnable about a pivot 5. The case 2 is sealed by a lid (not shown).

Figure 2:
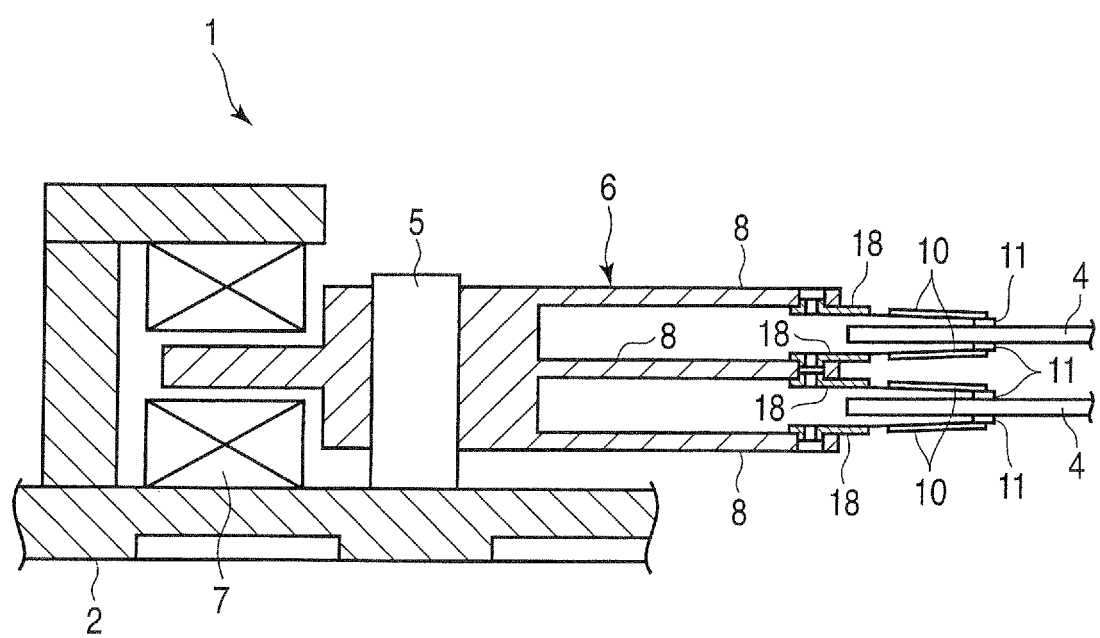
FIG. 2 is a partial sectional view of the disk drive shown in FIG. 1.

FIG. 2 is a sectional view typically showing a part of the disk drive 1. As shown in FIG. 2, the carriage 6 comprises arms 8. A suspension 10 is mounted on the distal end portion of each arm 8. A slider 11, which constitutes a magnetic head, is disposed on the distal end portion of the suspension 10. If each disk 4 is rotated at high speed, an air bearing is formed between the disk 4 and slider 11.

If the carriage 6 is turned by the positioning motor 7, the suspension 10 moves radially relative to the disk 4. Thereupon, the slider 11 moves to a desired track of the disk 4. Elements, such as magnetoresistive (MR) elements capable of conversion between electrical and magnetic signals, are disposed on an end portion of the slider 11. These elements access data that is, write or read data to or from a recording surface of the disk 4.

FIG. 3 shows the suspension 10 according to the first embodiment. This suspension 10 comprises a base section 18 including a baseplate 18a, hinge portion 19, load beam 20, flexure 21 with conductors, etc. The flexure 21 with conductors will hereinafter be simply referred to as the flexure. The load beam 20 is secured to its corresponding arm 8 (FIGS. 1 and 2) of the carriage 6 by the base section 18.

As shown in FIG. 3, the flexure 21 is located along the load beam 20. A region 21a (only a part of which is shown) of the flexure 21 that overlaps the load beam 20 is secured to the load beam 20 by fixing means, such as laser welding. A tongue 31 that functions as a gimbal portion is formed near the distal end of the flexure 21. The slider 11 is mounted on the tongue 31. The suspension 10 and slider 11 constitute a head gimbal assembly.

The flexure 21 comprises a flexure tail portion 21b. The flexure tail portion 21b extends rearward relative to the base section 18 from the load beam 20 to the arm 8 of the carriage 6. A terminal area 21c on the rear end of the flexure tail portion 21b is electrically connected to an amplifier (not shown) of the disk drive 1. A damper 60 is attached to the flexure tail portion 21b. The damper 60 will be described in detail later.

Figure 5:
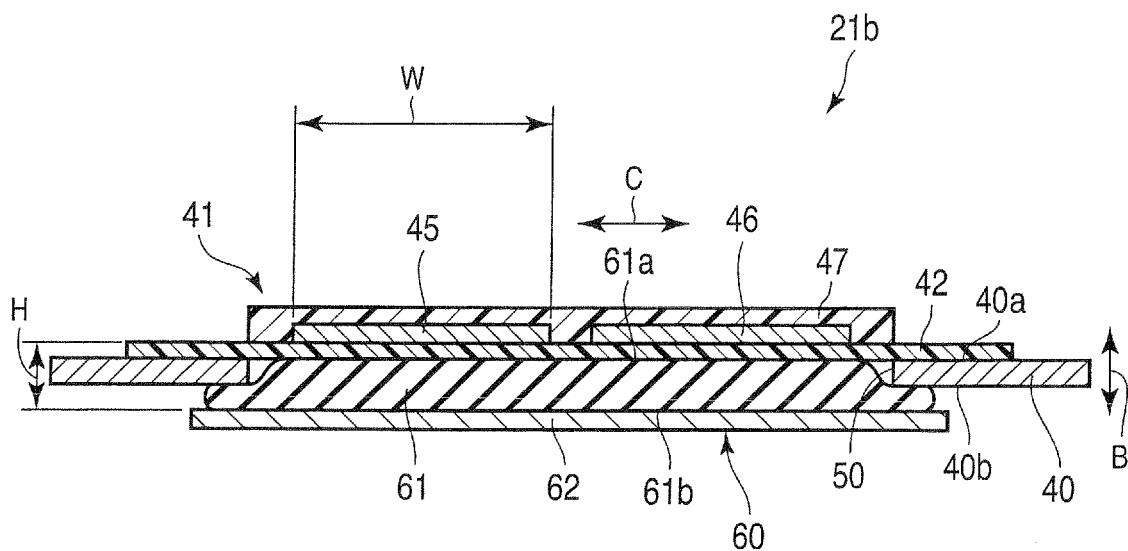
FIG. 5 is a sectional view of the flexure tail portion and damper taken along line F5-F5 of FIG. 3.
Figure 6:
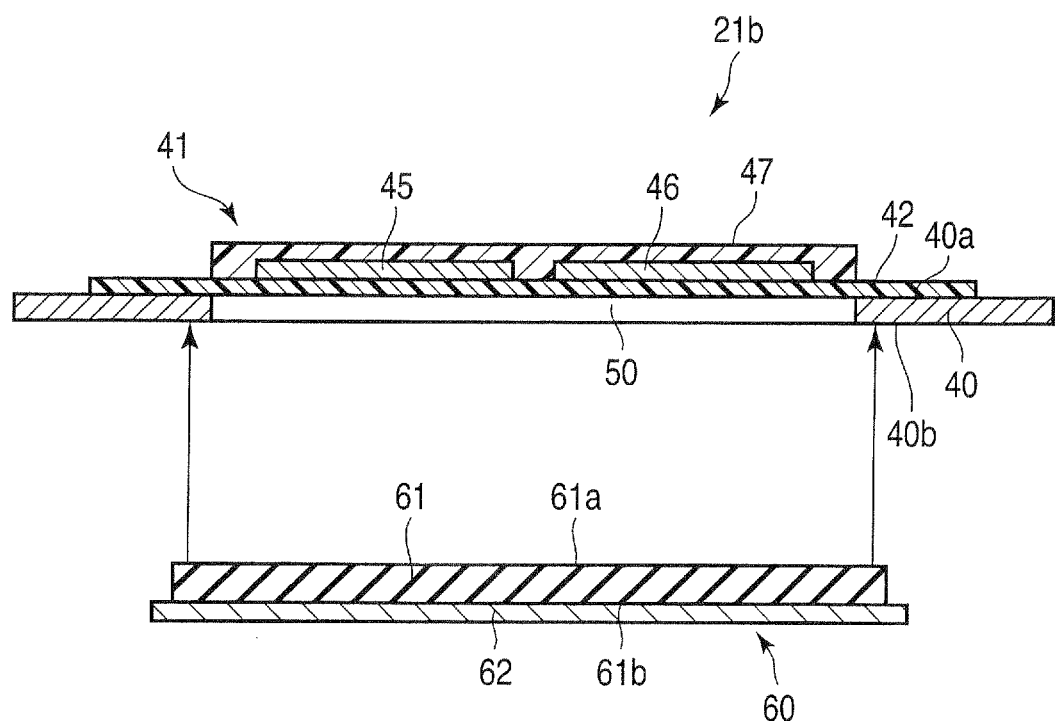
FIG. 6 is a sectional view showing the flexure tail portion and damper of FIG. 5 in a separate state.

FIGS. 5 and 6 show cross sections of the flexure tail portion 21b and damper 60. The flexure 21 with the flexure tail portion 21b comprises a metal base 40 and conductive circuit portion 41. The metal base 40 is formed of a thin springy stainless-steel sheet. The conductive circuit portion 41 is formed along the metal base 40. The circuit portion 41 comprises an electrically insulating layer 42, first and second conductive members 45 and 46, and resin cover 47. The conductive members 45 and 46 are formed on the insulating layer 42. The resin cover 47 covers the conductive members 45 and 46. The insulating layer 42 and resin cover 47 are formed of an electrically insulating material, such as polyimide.

The electrically insulating layer 42 is disposed on one surface 40a of the metal base 40. Further, the first and second conductive members 45 and 46 are arranged above the one surface 40a of the metal base 40 with the insulating layer 42 therebetween. The conductive members 45 and 46, which are formed of, for example, deposited copper, are located substantially parallel to each other. These conductive members 45 and 46 are formed into a predetermined pattern along the insulating layer 42 by etching or plating. One end of each of the conductive members 45 and 46 is electrically connected to an element (not shown) of the slider 11. The other end of each conductive member is electrically connected to the amplifier through the terminal area 21c.

Figure 4:
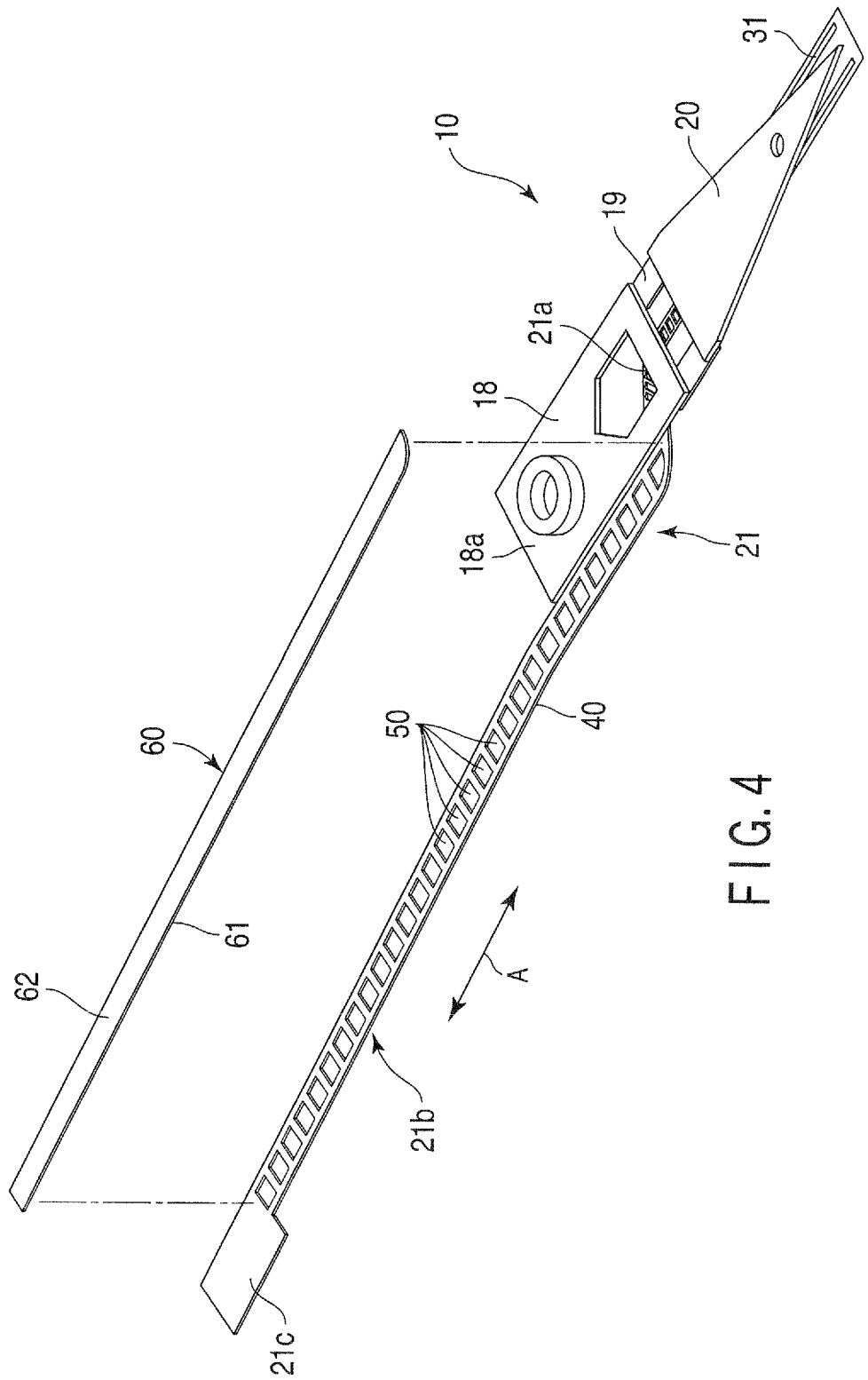
FIG. 4 is a perspective view showing a state before a damper is attached to a flexure tail portion of the suspension shown in FIG. 3.

In FIG. 4, arrow A indicates the longitudinal direction of the metal base 40. In FIG. 5, arrows B and C indicate the thicknesswise and transverse directions, respectively, of the metal base 40. In FIG. 5, symbol W designates the width (conductive member width) of each of the conductive members 45 and 46. The metal base 40 is thinner than the load beam 20. The load beam 20 is, for example, 30 to 62 µm thick, while the metal base 40 is, for example, 15 to 20 µm thick. The electrically insulating layer 42 and each of the conductive members 45 and 46 are, for example, 10 µm thick. While the conductive members 45 and 46 shown in FIG. 5 are configured for data writing, the flexure 21 may be provided with some other conductive members (e.g., a pair of conductive members for data reading, not shown).

As shown in FIG. 4, a plurality of apertures 50 are formed at regular intervals in the longitudinal direct (along the conductive members 45 and 46) of the metal base 40. The metal base 40 is electrically grounded to the amplifier. The apertures 50 are formed by etching a stainless-steel sheet, such as SUS304, the material of the metal base 40. SUS304 is a stainless steel conforming to Japanese Industrial Standards (JIS). The chemical composition of SUS304 comprises 0.08 or less carbon, 1.00 or less silicon, 2.00 or less manganese, 8.00 to 10.50 nickel, 18.00 to 20.00 chromium, and iron for the remainder.

The damper 60 is attached to the flexure tail portion 21b. The damper 60 comprises a viscoelastic member 61 and constrained plate 62 of a metal (conductor), such as stainless steel. The damper 60 is located on the other surface 40b (FIG. 5) of the metal base 40 of the flexure tail portion 21b and extends longitudinally relative to the metal base 40. The conductive members 45 and 46 are opposed to the constrained plate 62 with the viscoelastic member 61 between them. Distance H that is equal to the sum of the respective thicknesses of the member 61 and electrically insulating layer 42 is secured between the constrained plate 62 and conductive members 45 and 46. Further, the metal base 40 and constrained plate 62 electrically conduct to each other (or are short-circuited).

The viscoelastic member 61 is viscous, elastic, and flowage. It formed of a high polymer material (e.g., acrylic resin) that displays a viscous resistance corresponding to the degree of deformation. The viscoelastic member 61 has first and second surfaces 61a and 61b that are opposite relative to its thickness. The first surface 61a of the viscoelastic member 61 is secured to the metal base 40 of the flexure tail portion 21b by the adhesion of the member 61 itself. The first surface 61a of the viscoelastic member 61 is also secured to the electrically insulating layer 42 through the apertures 50. The second surface 61b of the viscoelastic member 61 is secured to the constrained plate 62 by the adhesion of the member 61 itself.

The viscoelastic member 61 adheres to the metal base 40 of the flexure tail portion 21b. The viscoelastic member 61 is elastic and flowage. If a force that causes the flexure tail portion 21b to vibrate is applied, therefore, the viscoelastic member 61 is displaced together with the vibrating metal base 40 and constrained plate 62. If the viscoelastic member 61 is deformed, internal resistance is produced by molecular friction, and the vibrational energy of the constrained plate 62 is converted into thermal energy. Thus, the viscoelastic member 61 can suppress the vibration of the flexure tail portion 21b.

Conventionally, a flexure is secured to a part of a metallic carriage in order to be prevented from swaying. For example, the flexure is prevented from moving by being partially inserted into a slit formed in a part of the carriage. If this is done, however, signal transmission in, for example, a high-frequency band may be somewhat electrically influenced, since stationary and non-stationary parts of the flexure have different electrical properties. According to the present embodiment, on the other hand, the damper 60 affixed to the flexure tail portion 21b can suppress vibration of the tail portion 21b. Thus, electrical influence observed when the flexure tail portion 21b is secured to the carriage 6 can be avoided.

Figure 7:
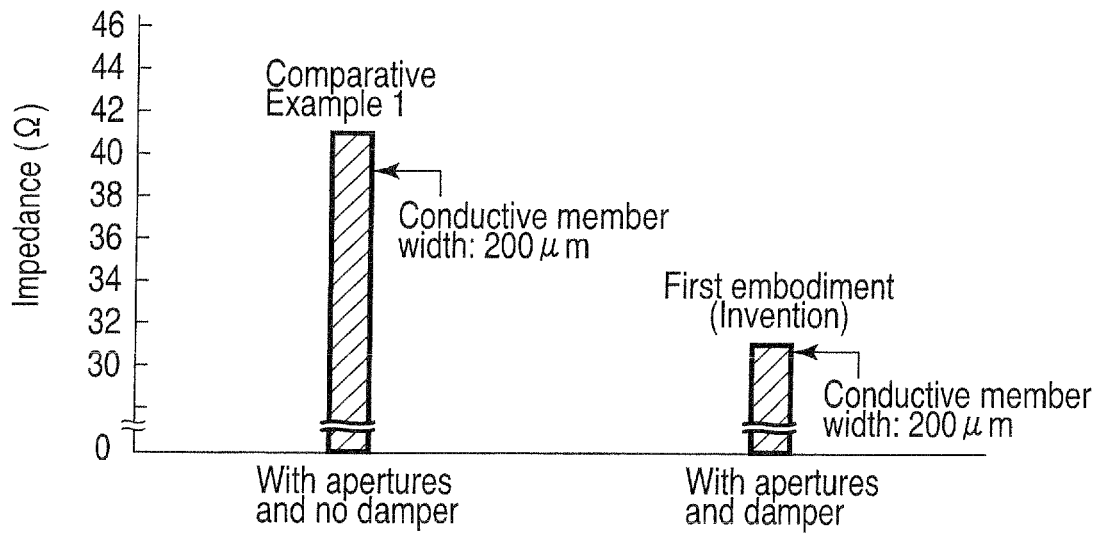
FIG. 7 is a graph comparatively showing the respective impedances of the first embodiment and Comparative Example 1.

FIG. 7 is a graph comparatively showing the respective impedances of the flexure 21 of the first embodiment and a flexure of Comparative Example 1. The flexure 21 of the first embodiment comprises the metal base 40, which is formed with the apertures 50, and the damper 60. Conductor width W of the flexure 21 is 200 μm. Although the flexure of Comparative Example 1 comprises a metal base with apertures, it is not provided with a damper. The conductive member width of this flexure is 200 μm.

In the flexure 21 of the first embodiment, the metallic constrained plate 62 is formed along the apertures 50 of the metal base 40. By doing this, the impedance of this flexure 21 can be made about 10Ω lower than that of the flexure of Comparative Example 1.

In the flexure 21 of the first embodiment, distance H that exceeds the thickness of the viscoelastic member 61 is secured between the constrained plate 62 and conductive members 45 and 46. Despite the presence of the metallic constrained plate 62, therefore, the flexure 21 of the first embodiment can suppress an increase in capacitance component. Since the metallic constrained plate 62 is located along the apertures 50 in this flexure 21, moreover, magnetic fields that leak from the conductive members 45 and 46 can be reduced, so that crosstalk can be reduced.

Figure 8:
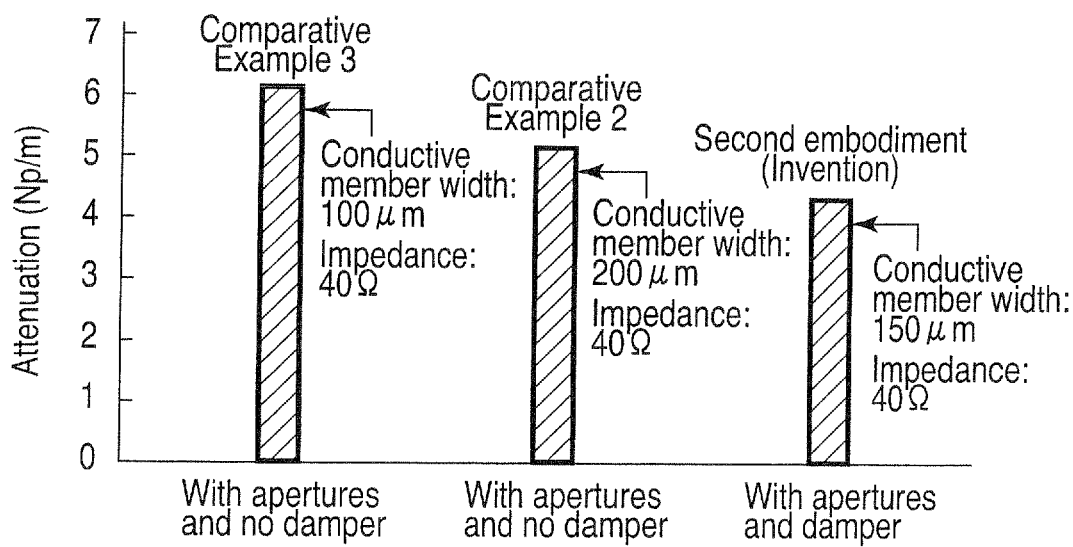
FIG. 8 is a graph comparatively showing the respective levels of attenuation of a second embodiment of the invention and Comparative Examples 2 and 3.

FIG. 8 is a graph comparatively showing the levels of the respective losses (eddy-current losses) of flexures of a second embodiment and Comparative Examples 2 and 3. The flexure of the second embodiment comprises a metal base with apertures and a damper, and its conductive member width is 150 μm.

Although the flexure of Comparative Example 2 comprises a metal base with apertures, it is not provided with a damper. The conductive member width of this flexure is 200 μm. According to Comparative Example 3, a metal base is not formed with apertures, no damper is attached to the flexure, and the conductive member width is 100 μm. The impedance of any of these flexures is 40Ω. The apertures in the metal base make the attenuation of the flexure of Comparative Example 2 lower than that of the flexure of Comparative Example 3.

In the flexure according to the second embodiment of the invention, a metallic constrained plate is located along the apertures of the metal base. Thus, the attenuation of this flexure can be made further lower than that of the flexure of Comparative Example 2. Since the conductive member width of the second embodiment is 150 μm, which is smaller than that (200 μm) of Comparative Example 2, moreover, the width of a conductive circuit portion 41 can be made small, thus enabling a space-saving design.

Figure 9:
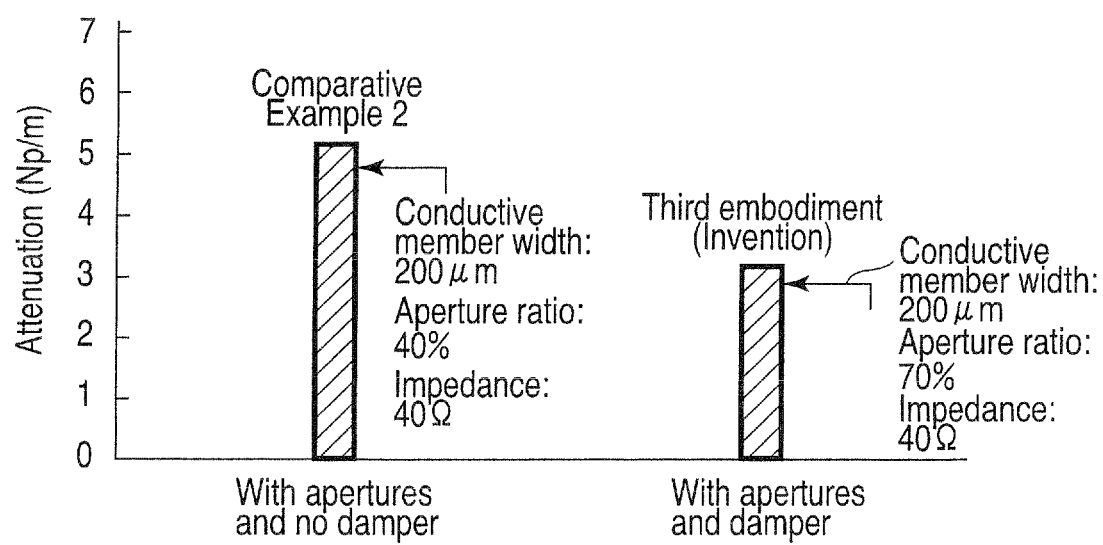
FIG. 9 is a graph comparatively showing the respective levels of attenuation of a third embodiment of the invention and Comparative Example 2.

FIG. 9 is a graph comparatively showing the levels of the respective losses (eddy-current losses) of flexures of a third embodiment and Comparative Example 2. The flexure of the third embodiment comprises a metal base with apertures and a damper, and its conductive member width is 200 μm. The flexure of Comparative Example 2 comprises the metal base with the apertures and is not provided with a damper, and its conductive member width is 200 μm. The impedance of either of these flexures is 40Ω. Thus, the conductive member width and impedance are common to the third embodiment and Comparative Example 2. While the aperture ratio of the apertures of Comparative Example 40%, in this case, that of the third embodiment 70%. Thus, the loss (or attenuation) can be further reduced according to the third embodiment.

Figure 10:
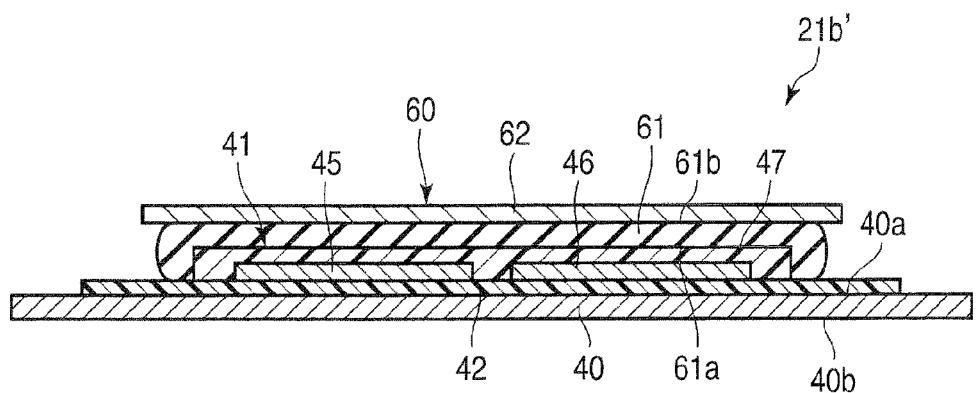
FIG. 10 is a sectional view showing a flexure tail portion and damper according to a fourth embodiment of the invention.
Figure 11:
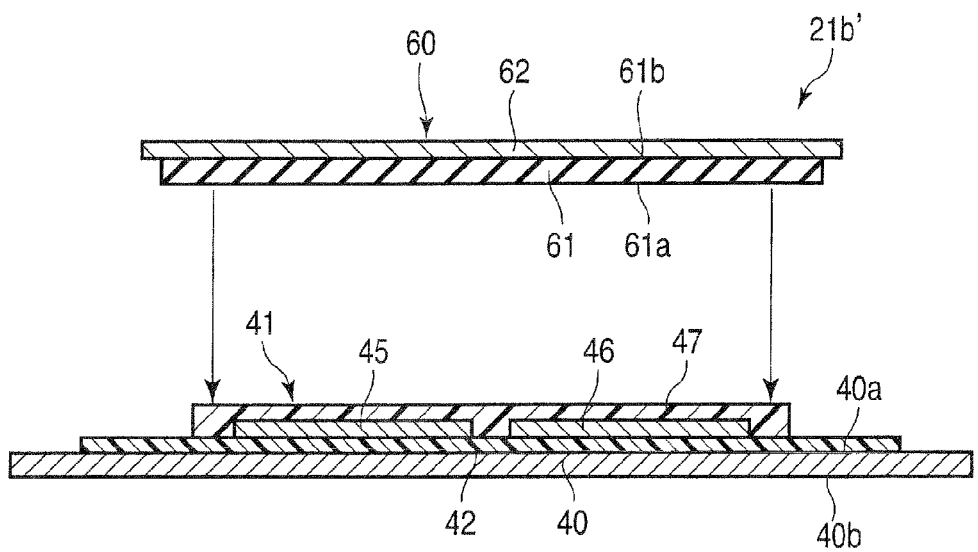
FIG. 11 is a sectional view showing the flexure tail portion and damper of FIG. 10 in a separate state.

FIG. 10 is a transverse sectional view showing a flexure tail portion 21b' and damper 60 according to a fourth embodiment of the invention. FIG. 11 shows a state before the damper 60 is attached to the flexure tail portion 21b. A metal base 40 of this embodiment is not provided with apertures. An electrically insulating layer 42 is disposed on one surface 40a of the metal base 40. Conductors 45 and 46 are arranged above the one surface 40a of the metal base 40 with the insulating layer 42 therebetween. The conductive members 45 and 46 are covered by a resin cover 47.

The damper 60 is located above the conductive members 45 and 46 with the resin cover 47 therebetween. The damper 60 is secured to a conductive circuit portion 41 of the flexure tail portion 21b from above the resin cover 47 by the adhesion of a viscoelastic member 61. Alternatively, the damper 60 may be disposed directly on the conductive members 45 and 46. A metal, such as copper or aluminum that is higher in electrical conductivity than stainless steel, is a suitable material for a constrained plate 62 of the damper 60. Since other configurations are the same as those of the first embodiment (FIGS. 3 to 6), common numbers are used to designate common parts of the embodiments, and a description of those parts is omitted.

Also in the flexure tail portion 21b' of the fourth embodiment, the constrained plate 62 is opposed to the conductive members 45 and 46 with the viscoelastic member 61 between them. Thus, the electrical properties (especially an electromagnetic shielding effect or the like) can be improved by the constrained plate 62, and a damping effect can be produced by the damper 60. Preferably, the metal base 40 and constrained plate 62 should be caused to electrically conduct to each other (or be short-circuited).

Figure 12:
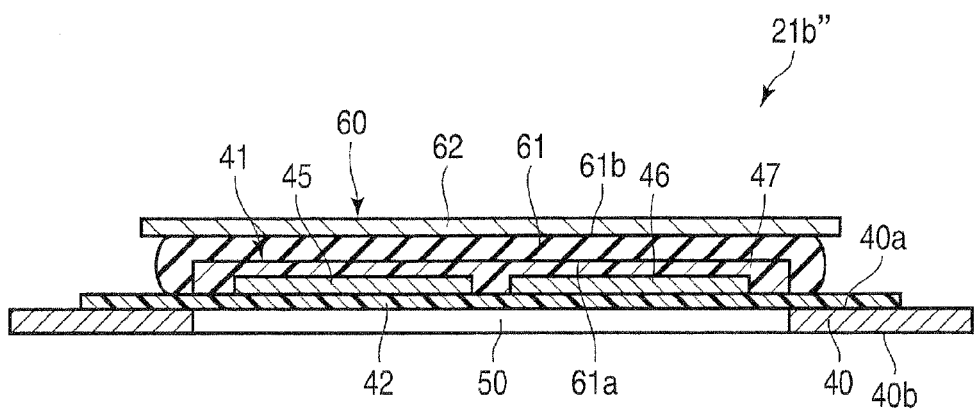
FIG. 12 is a sectional view showing a flexure tail portion and damper according to a fifth embodiment of the invention.

FIG. 12 is a transverse sectional view showing a flexure tail portion 21b" and damper 60 according to a fifth embodiment of the invention. An aperture 50 is formed in a metal base 40. Since other configurations are the same as those of the fourth embodiment (FIGS. 10 and 11), common numbers are used to designate common parts of the embodiments, and a description of those parts is omitted. The flexure tail portion 21b" of this embodiment can also ensure an improvement in electrical properties (reductions in impedance, loss, etc.) by a constrained plate 62 and a damping effect by the damper 60.

According to the embodiments of the present invention, as described herein, the damper comprising the constrained plate is located along the flexure tail portion. Thus, the impedance of the conductive circuit portion can be made lower than that of the conventional flexure (with the apertures in the metal base) that comprises no damper. Further, the conductive member width can be reduced if the impedance is equal to that of the conventional flexure. Furthermore, the aperture ratio of the apertures of the metal base can be increased if the conductive member width and impedance are equal to those of conventional flexure. Thus, the eddy-current loss is reduced, and a high-frequency band can be ensured, so that the electrical properties can be improved. For example, signals can be transmitted more quickly. Since vibration of the flexure tail portion can be suppressed by the damper, moreover, the problem of resonance by vibration can be solved.

It is to be understood, in carrying out the present invention, that the shapes, materials, layouts, etc., of the metal base, electrically insulating layer, conductive members, damper, etc., which constitute the flexure tail portion, as well as the configurations of the load beam and flexure with conductors, which constitute the disk drive suspension, may be embodied in various forms.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flexure to be secured to a load beam of a disk drive suspension, the flexure comprising:
   a flexure tail portion,
   wherein the flexure tail portion comprises:
      a metal base formed of a metal plate with a plurality of apertures aligned along the flexure tail portion, the metal base having a first surface and a second surface;
      an electrically insulating layer of an electrically insulating material formed on the first surface of the metal base, the electrically insulating layer having an inner face which is disposed directly over the apertures; and
      a conductive portion comprising a plurality of conductive members which are formed on the electrically insulating layer and which extend longitudinally relative to the metal base,
   wherein the flexure tail portion is fitted with a damper,
   wherein the damper comprises:
      a viscoelastic member having a first surface and a second surface, the first surface being secured to the second surface of the metal base of the flexure tail portion, and the first surface of the viscoelastic member having a first adhering portion which is adhered to the metal base, and a second adhering portion which is inserted into the apertures of the metal base and adhered to the inner face of the electrically insulating layer; and
      a metallic constrained plate secured to the second surface of the viscoelastic member and extending longitudinally relative to the metal base along the conductive members, and
   wherein the constrained plate and the conductive members face each other with the viscoelastic member therebetween.

2. The flexure according to claim 1, wherein the apertures are aligned in a region with a width greater than a width of the conductive portion, and the constrained plate has a width greater than a width of the apertures.

3. A disk drive suspension comprising:
   a load beam; and
   the flexure of claim 1,
   wherein the flexure is secured to the load beam.

* * * * *